(12) United States Patent
Cooprider

(10) Patent No.: US 12,183,130 B2
(45) Date of Patent: Dec. 31, 2024

(54) TRAILER MONITORING FOR DETECTING INATTENTIVE DRIVING

(71) Applicant: Stoneridge, Inc., Novi, MI (US)

(72) Inventor: Troy Otis Cooprider, White Lake, MI (US)

(73) Assignee: Stoneridge, Inc., Novi, MI (US)

( * ) Notice: Subject to any disclaimer, the term of this patent is extended or adjusted under 35 U.S.C. 154(b) by 280 days.

(21) Appl. No.: 17/689,230

(22) Filed: Mar. 8, 2022

(65) Prior Publication Data

US 2022/0292887 A1 Sep. 15, 2022

Related U.S. Application Data

(60) Provisional application No. 63/159,683, filed on Mar. 11, 2021.

(51) Int. Cl.
*G07C 5/00* (2006.01)
*G07C 5/04* (2006.01)
*G07C 5/08* (2006.01)

(52) U.S. Cl.
CPC .............. *G07C 5/04* (2013.01); *G07C 5/085* (2013.01); *G07C 5/008* (2013.01)

(58) Field of Classification Search
CPC .......... G07C 5/04; G07C 5/085; G07C 5/008; B60W 2300/14; B60W 2420/403; B60W 2520/22; B60W 2520/28; B60W 2552/53; B60W 40/09; B60W 40/08; B60W 2040/0818; B60W 2530/203; B60W 2540/229; B60W 2756/10; B60W 50/14; B60W 60/0015; B60W 2554/4047
See application file for complete search history.

(56) References Cited

U.S. PATENT DOCUMENTS

| | | | |
|---|---|---|---|
| 4,341,395 A * | 7/1982 | Miller ................ | B62D 53/0878 340/431 |
| 2006/0103513 A1 | 5/2006 | Ihara et al. | |
| 2006/0217861 A1 * | 9/2006 | Ihara .................... | B62D 15/029 701/41 |
| 2006/0244579 A1 * | 11/2006 | Raab ...................... | B60T 8/241 340/438 |
| 2019/0213429 A1 * | 7/2019 | Sicconi ................... | G06F 3/012 |
| 2019/0217831 A1 * | 7/2019 | Viele ..................... | B60D 1/245 |
| 2020/0101898 A1 | 4/2020 | Omanovic et al. | |
| 2022/0203996 A1 * | 6/2022 | Katz ..................... | B60W 50/14 |

FOREIGN PATENT DOCUMENTS

DE 102017011186 A1 6/2018

OTHER PUBLICATIONS

International Preliminary Report on Patentability for International Patent Application No. PCT/US2022/019250 dated Sep. 21, 2023.
International Search Report and Written Opinion for International Patent Application No. PCT/US2022/019250 completed on Jun. 7, 2022.

* cited by examiner

*Primary Examiner* — Bao Long T Nguyen
(74) *Attorney, Agent, or Firm* — Carlson, Gaskey & Olds, P.C.

(57) ABSTRACT

A method for detecting inattentive vehicle operation in a commercial vehicle includes monitoring a motion of a rear portion of a trailer and identifying a motion trend. The method compares the motion trend with a set of known inattentive driving trends and identifies an inattentive driving event when the identified trend matches a known inattentive driving trend in the set of known inattentive driving trends.

16 Claims, 4 Drawing Sheets

TRAILER MONITORING FOR DETECTING INATTENTIVE DRIVING

CROSS-REFERENCE TO RELATED APPLICATION

This application claims priority to U.S. Provisional Patent Application No. 63/159,683 filed on Mar. 11, 2021.

BACKGROUND

This application relates to driver monitoring systems and techniques, and more particularly to monitoring a vehicle trailer to assist in detecting inattentive driving.

Operating a vehicle while distracted, or otherwise inattentive, can result in decreased safety or efficiency of the vehicle operations. In the area of commercial shipping or transport it is desirable to monitor the attentiveness or lack thereof of drivers and other vehicle operators. Monitoring the attentiveness of the vehicle operators enables a fleet manager or fleet management system to determine when additional training may be required for vehicle operators. When the fleet management system includes driving event detection, monitoring attentiveness can provide additional benefits, as the driving event detection can be correlated with detecting attentiveness, and the fleet management system can determine when, or if, remedial action after a driving event may be beneficial. The remedial action can include training, disciplinary action, investigations, or any other follow up action that may be required.

SUMMARY OF THE INVENTION

An exemplary method for detecting inattentive vehicle operation in a commercial vehicle includes monitoring a motion of a rear portion of a trailer and identifying a motion trend, comparing the motion trend with a set of known inattentive driving trends, and identifying an inattentive driving event when the identified trend matches a known inattentive driving trend in the set of known inattentive driving trends.

Another example of the above described method for detecting inattentive vehicle operation in a commercial vehicle further includes responding to an identified inattentive driving event by storing video from a driver monitoring system.

In another example of any of the above described methods for detecting inattentive vehicle operation in a commercial vehicle the stored video includes a duration before the identified inattentive driving event.

In another example of any of the above described methods for detecting inattentive vehicle operation in a commercial vehicle the set of known inattentive driving trends includes sinusoidal swaying of the rear portion of the trailer, abrupt motion of the rear portion of the trailer, and a lack of motion of the rear portion of the trailer as compared to one of a lane line and a road edge detection.

In another example of any of the above described methods for detecting inattentive vehicle operation in a commercial vehicle the motion of the rear portion of the trailer is monitored using exclusively image-based monitoring.

In another example of any of the above described methods for detecting inattentive vehicle operation in a commercial vehicle the motion of the rear portion of the trailer is monitored using a combination of image-based monitoring and at least one other motion type monitoring.

In another example of any of the above described methods for detecting inattentive vehicle operation in a commercial vehicle the at least one other motion type monitoring includes at least one of a trailer wheel speed monitor, a lane detector, a road edge detector, and a positioning system.

In another example of any of the above described methods for detecting inattentive vehicle operation in a commercial vehicle the trailer is a rearmost trailer of a multi-trailer vehicle.

In another example of any of the above described methods for detecting inattentive vehicle operation in a commercial vehicle the trailer is an intermediate trailer in a multi-trailer vehicle.

In another example of any of the above described methods for detecting inattentive vehicle operation in a commercial vehicle the set of known inattentive driving trends includes rule-based driving trends and machine learning determined driving trends.

In one exemplary embodiment a commercial vehicle includes a tractor and at least one trailer, and an inattentive driving detector including a trailer monitoring system, the trailer monitoring system including at least a camera configured to capture a rear portion of the trailer and being configured to monitoring a motion of the rear portion of a trailer and identify a motion trend, compare the motion trend with a set of known inattentive driving trends, and identify an inattentive driving event when the identified trend matches a known inattentive driving trend in the set of known inattentive driving trends.

Another example of the above described commercial vehicle further including a driver monitoring system including at least one camera configured to capture at least a portion of a vehicle operator.

In another example of any of the above described commercial vehicles the driver monitoring system includes a buffer configured to store a duration of video feed from the at least one camera in response to an inattentive driving event, the duration of video feed at least partially preceding the detected inattentive driving event.

In another example of any of the above described commercial vehicles the trailer monitoring system further including at least one of a trailer wheel speed sensor, a lane line sensor, a trailer hitch angle sensor, and a road edge sensor.

In another example of any of the above described commercial vehicles the trailer is one of multiple sequentially connected trailers.

In another example of any of the above described commercial vehicles the trailer is a rear trailer in the multiple sequentially connected trailers.

In another example of any of the above described commercial vehicles the trailer is not the rear trailer in the multiple sequentially connected trailers.

The embodiments, examples, and alternatives described in the claims and in the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
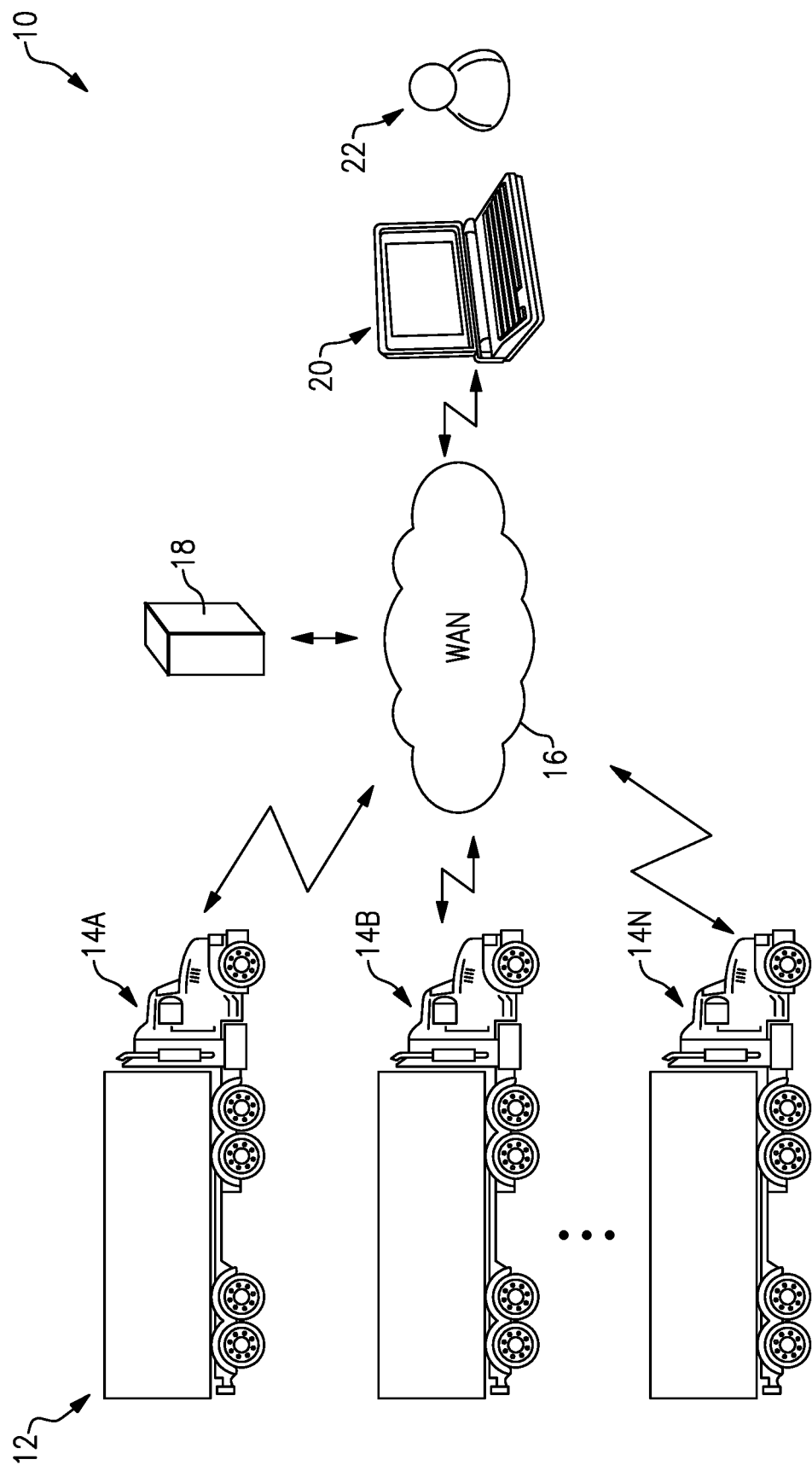
FIG. 1 schematically illustrates an example fleet and fleet management system.

FIG. 1 schematically illustrates an example fleet management system 10 that includes a fleet 12 of vehicles 14A-N operable to communicate with a fleet manager 22 through a wide area network ("WAN") 16, such as the Internet. The vehicles 14 are operable to record images depicting portions of the vehicles 14, and to store or transmit those images, optionally along with associated event data describing how the vehicles 14 are being operated (e.g., acceleration events, steering events, braking events, near collisions, etc.). In some examples, the images are used as part of a mirror replacement system. In alternative examples, the images are provided by one or more dedicated cameras designed to monitor portions of the vehicle. In some examples, the vehicles 14 also transmit either raw sensor data or processed and analyzed sensor data to the fleet management system 10, with the sensor data being indicative of driving events and/or indicative of vehicle dynamics. The combination of data sources used to monitor the trailer position and orientation relative to the tractor generate what is collectively referred to as trailer monitoring data, which can include data such as images that is used for multiple purposes by the controller, sensor gpr data of the trailer, and the like.

In one example, the vehicles 14A-N transmit the images and/or event data to the fleet manager 22 by transmitting the images to a fleet management server 18, where they can be accessed by a computing device 20 of the fleet manager 22 that supervises the fleet 12. In one example, the vehicles 14A-N can transmit the images and/or event data to the fleet manager 22 by transmitting to the computing device 20 of the fleet manager 22, bypassing the fleet management server 18.

In one example, in addition to (or as an alternative to) transmitting the images to the fleet manager 22, the vehicles 14 store the images in a local repository in the vehicles 14. In one example, whether a given image is transmitted via the WAN 16 or is stored in the local repository is based on whether the vehicle 14 currently has connectivity to the WAN 16. In the example of FIG. 1, the vehicles 14 are trucks, but it is understood that other commercial vehicles could be used, such as delivery vans and the like.

Once data is received by the fleet management server 18, the data is analyzed to determine whether the driver was inattentive (i.e., distracted) while driving the vehicle at any given time, and appropriate responses can be initiated. In alternative systems, the data can be analyzed locally on the vehicle in the same manner as it would be on the fleet management system.

Figure 2:
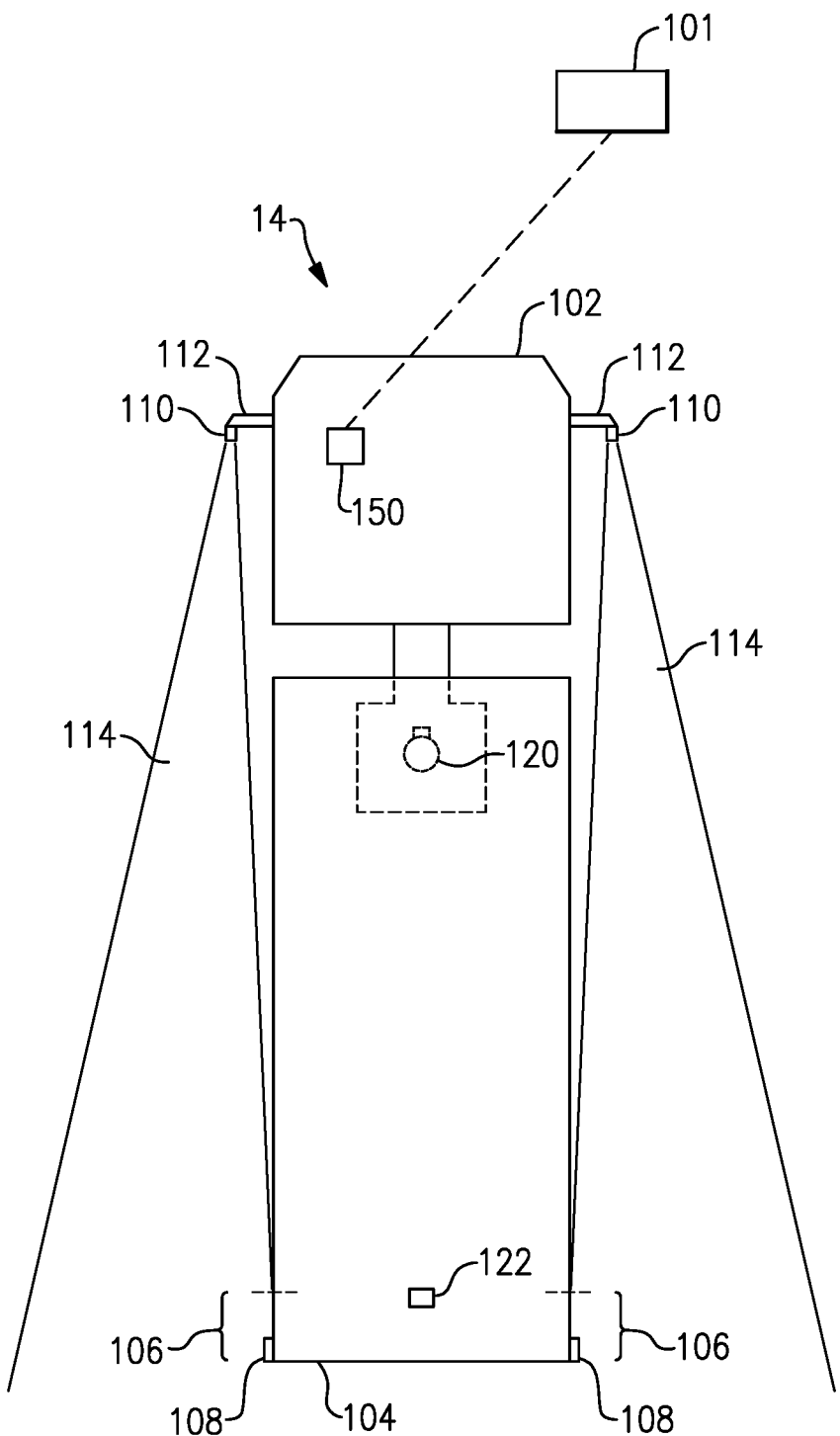
FIG. 2 schematically illustrates an example commercial shipping vehicle.

With continued reference to FIG. 1, FIG. 2 schematically illustrates a single exemplary commercial vehicle 14 include a tractor 102 and a trailer 104. Multiple cameras 110 are included in wings 112 on either side of the tractor 102. Each camera 110 has a corresponding field of view 114 that includes a portion 106 of the trailer 104. In some examples, the cameras 110 are incorporated in a mirror replacement system and can include multiple distinct cameras and fields of view able to generate images for field of visions classes II, IV, V, VI and VIII. In alternative examples, the cameras 110 can be included as parts of a dedicated trailer monitoring system, an image-based analysis system, or any other vehicle system.

In some examples, additional sensors including a hitch sensor 120, a position tracking sensor 122, accelerometers, trailer wheel speed sensor or any other type of motion detection sensor can be included on the trailer 104. In addition, the trailer 104 can include markings 108 or other identification features disposed on the rear end of the trailer 104 and within a field of view 114 of at least one camera 110. Further examples can include lane line detection and/or road edge detection based on image analysis to further enhance the inattentive driving detection.

During operation of the vehicle 14, minor rotations or variations of the trajectory of the tractor 102 are carried through to the trailer 104. Due to the pivoting nature of the hitch 120 connection, the minor shifts to the vehicle trajectory are amplified, and are thus more visible, at the end of the trailer 104. Positioning one or more sensors, or sensing features at an end of the trailer 104 farthest from the tractor 102 can further assist in detecting inattentive driving due to the amplification of the minor shifts or turns (i.e. the trajectory variations) that can be viewed at the rear of the trailer 104. Steering wheel angle input, lane marker input (combined with the amplifications). While illustrated herein within the context of a single trailer, it is appreciated that the amplifications are further magnified in systems utilizing two, three, or more additional trailers (i.e., multi-trailer vehicles) with the number of trailers increasing the amplification. In a multi-trailer vehicle application, the monitoring can be of the rear most trailer of the vehicle, or an intermediate trailer, with the particular trailer selected being the trailer with the most amplification of driving perturbations.

Monitoring of the trailer 104 can be facilitated using a tractor controller 150 disposed in the tractor 102 or via a remote monitoring system 101 connected to the tractor via a wireless access network (WAN). The tractor controller 150 and the remote monitoring system 101 are collectively referred to herein as the monitoring hardware.

The monitoring hardware continuously monitors the variations and perturbations at the end of the trailer 104 to identify patterns or trends in the variations. The patterns or trends are compared with a set of known patterns and trends to determine whether the detected patterns and trends are indicative of inattentive vehicle operation.

By way of example, in some cases a swerve to avoid an object in the road may be minor, but indicative of suddenly becoming aware of an object. In such a case, the minor swerve is amplified at the rear of the trailer, and the monitoring hardware is more easily able to detect the swerve by monitoring the trailer than by monitoring the tractor. Similarly, a driver nodding off due to fatigue will generate minor sinusoidal variations in the steering of the truck. While these variations may be difficult to detect at the steering wheel, the amplification at the trailer end makes the sinusoidal variations more apparent. In another example, an abrupt steering or acceleration correction that is relatively small is amplified at the rear end of the trailer, and the correction is more easily detected. In yet another example, when the driver maintains a course that is too steady the lack of movement at the rear of the trailer relative to the line markings and/or edge of road detection is indicative of a potential movement issue. In other examples, the amplification at the trailer end can provide an indication as to whether certain truck actions (e.g. curve cutting) are the result of a distracted driving incident or are the result of attentive operations.

In another example, it is appreciated that attentive operation of the tractor 102 will include minor steering and acceleration adjustments as warranted by the particular driving conditions. In addition to sudden steering and/or braking, steering and acceleration that are too consistent can be indicative of distracted driving. By determining the attentiveness of the driver based on the trailer monitoring, the difference between the minor adjustments of attentive driving and the consistency of inattentive driving are more evident and easier to distinguish.

Figure 3:
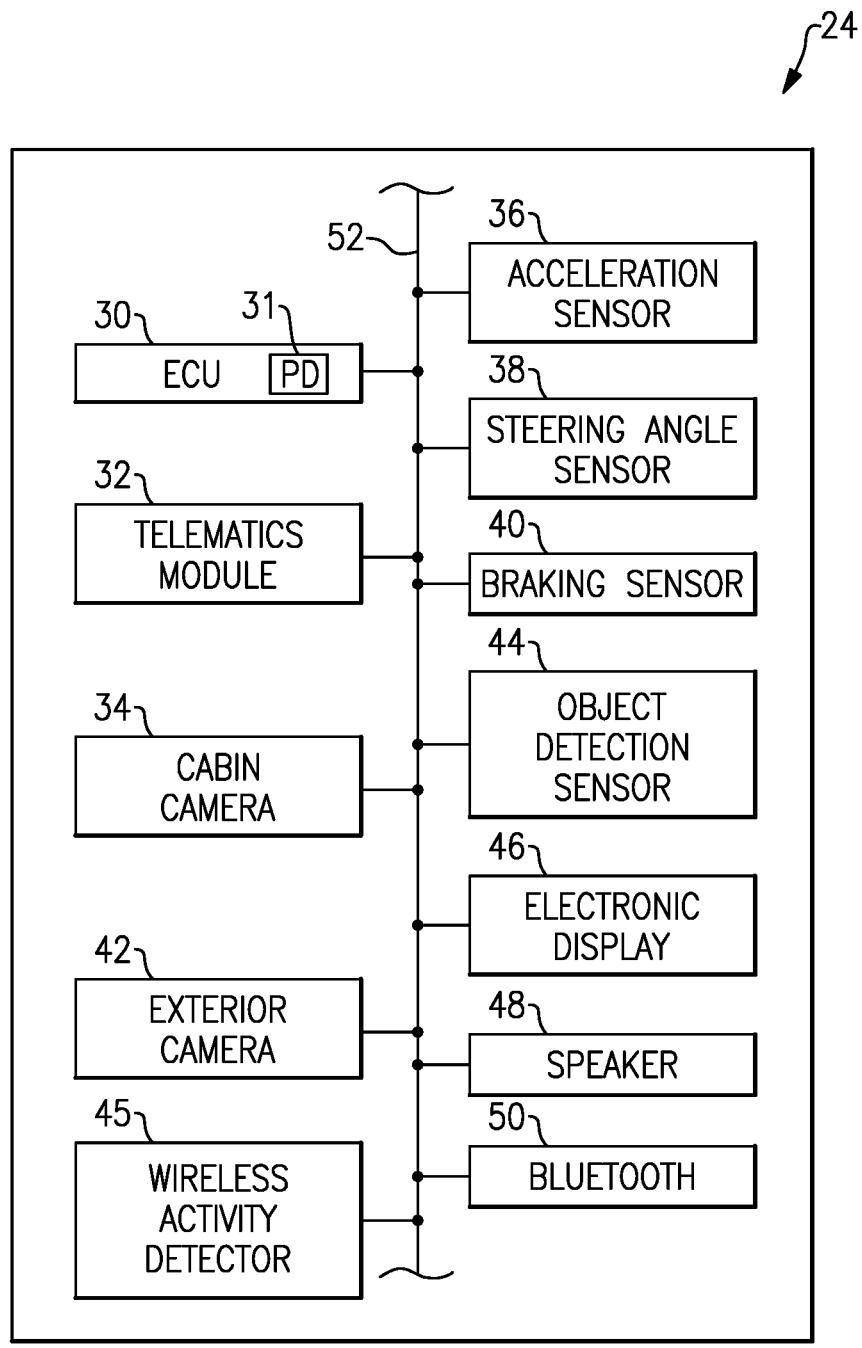
FIG. 3 schematically illustrates an exemplary control system for a vehicle.
Figure 4:
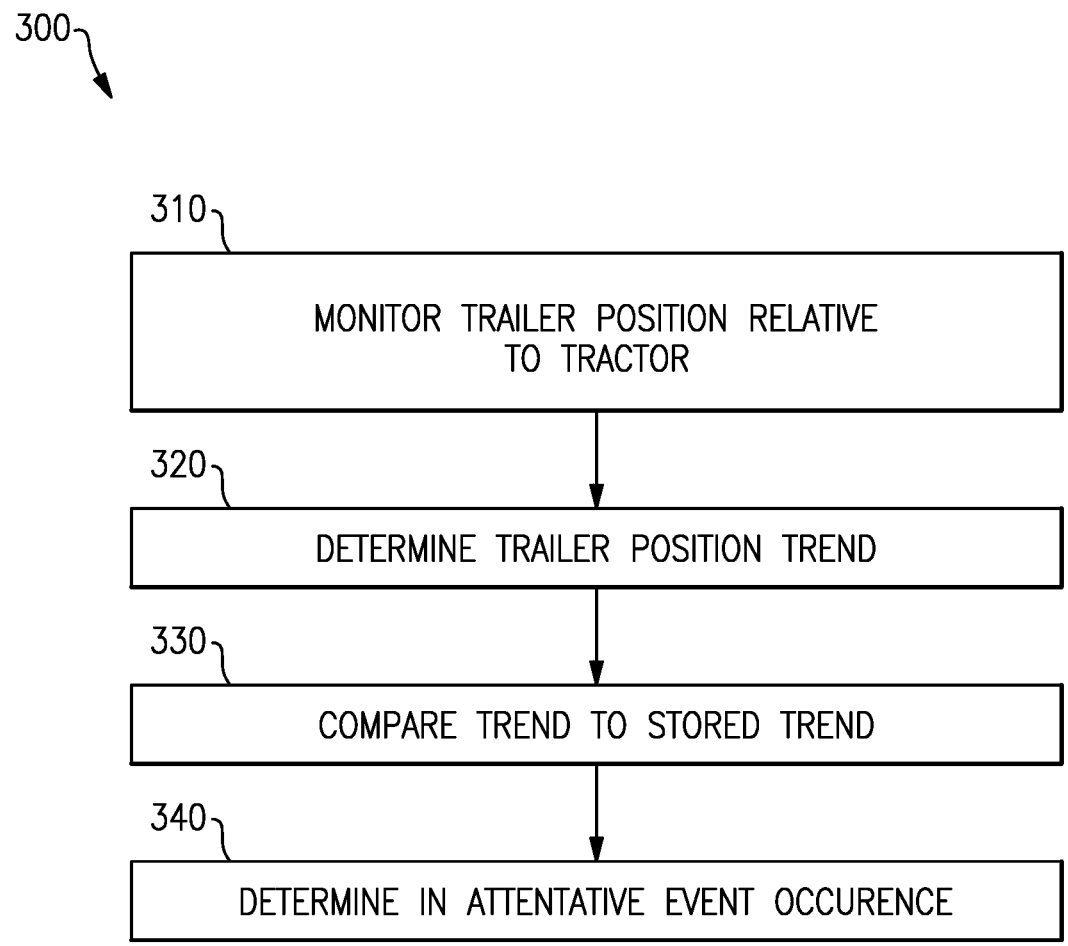
FIG. 4 schematically illustrates an exemplary process for identifying inattentive driving at least partially utilizing trailer monitoring in a tractor trailer configuration.

FIG. 3 schematically illustrates components of an example driver monitoring system 24 provided in each vehicle 14 according to one example. In the example of FIG. 3, the driver monitoring system 24 includes an electronic control unit (ECU) 30 which is operably connected to a telematics module 32, a cabin camera 34, an acceleration sensor 36, a steering angle sensor 38, and a braking sensor 40. Although three sensors 34-38 are described, it is understood that fewer or more sensors could be used. For example, the ECU 30 may be operably connected to an exterior camera 42 configured to record images of a surrounding environment of the vehicle 14, an object detection sensor 44 operable to detect objects exterior to the vehicle 14, a wireless activity detector 45 operable to detect wireless device usage by a driver, an electronic display 46, a vehicle speaker 48, and/or a Bluetooth module 50.

In one example, the electronic display 46 and speaker 48 are part of a driver information system ("DIS") that provides information about a vehicle status (e.g., speed, engine RPMs, etc.). In this example, the electronic display 46 could be part of a vehicle instrument cluster. As another example, the electronic display 46 could be a center console display that is part of an infotainment system that provides a combination of vehicle information and entertainment information (e.g., current radio station, climate control, and the like). In one example, the ECU 30 is integrated into a DIS ECU (not shown) or the telematics module 32. In the example of FIG. 2, the ECU 30 is operably connected to the components 31-50 through a vehicle data bus 52, which may be a controller area network ("CAN") bus. FIG. 2 is an example, and it is understood that the ECU 30 could connect to certain ones of the components 32-50 through other connections in addition to, or instead of, the vehicle data bus 52.

In some examples a trailer monitor 31 is included within the ECU 30 of the driver monitoring system 24. The trailer monitor 31 includes software configured to analyze images of the trailer 104 and sensor data from the vehicle sensors, and thereby determine motion of the trailer 104.

The motion of the trailer 104 is then compared with known patterns of motion that are indicative of distracted, or otherwise inattentive, driving. As discussed previously, certain "trends" in the motion such as sinusoidal variations, too linear of an operation, stuttering and/or sudden swings in one direction can be classified as known patterns indicative of distracted driving events. In addition to the general shape of the motion, features such as the magnitude of the motion are considered as well with the amplification at the trailer end making it easier to distinguish between a normal operation and a detection matching an inattentive operation. When a match is identified, the ECU 30 determines that inattentive driving has occurred, and the ECU 30 can then correlate the inattentive driving with a driving event, flag vehicle operations data for future review at the time of the inattentive driving, or any other response.

With continued reference to FIG. 1-3, FIG. 4 schematically illustrates an exemplary process 300 for using trailer positioning to detect an attentiveness of the driver. In the process, the ECU 30 continuously monitors the trailer position relative to the tractor in a "Monitor Trailer Position Relative to Tractor" step 310. The trailer monitoring can be performed via image analysis, sensor detection, global positioning, or any combination thereof. The continuous positioning is then consolidated into trends indicating trailer displacement angle, a rate at which the angle changes, as well as any number of additional details that are directly sensed or derived from available sensor information in a "determine Trailer Position Trend" step 320.

The determined trends are compared with a set of known trends within the ECU 30 in a "Compare Trend to Stored Trend" step 330. If the trends match within a certain degree of similarity, the ECU determines that the trend is the result of inattentive driving in a "Determine Inattentive Event Occurrence" step 340. The set of stored trends includes, in some examples, trends identified via empirical testing. In other examples, the trends can be identified via machine learning algorithms trained via analyzing a complete data set including tagged inattentive events thereby providing a holistic trend identification.

In another implementation, the trailer monitoring system 31 continuously monitors the trailer positions and the data is aggregated and stored. When a driving event (e.g. a swerve, a hard break, hard acceleration, etc.) is determined to have occurred using any other vehicle sensor systems, the trailer position data preceding the event, and following the event can be analyzed alone, or in conjunction with other sensor information, to determine if the trailer position throughout the time period is indicative of inattentive driving. When the trailer position trends are indicative of distracted driving a fleet manager can then determine the appropriate corrective action including training, discipline, further review, and the like.

In yet another example, the inattentive driving detection can be paired with a driver monitoring system including one or more cameras and sensors capturing the vehicle operator, portions or the vehicle, and any other related information. The cameras and sensors operate with a buffer such that when an inattentive driving event is detected, the system can capture and store the time period leading up to the event and subsequent to the event. By way of example, if the trailer monitoring determines that an inattentive event occurred based on the motion of the rear of the trailer a signal is provided to a driver monitoring system and the camera(s) within the driver monitoring system capture the video feed of the driver for five minutes leading up to and five minutes subsequent to the detection. In a practical implementation the duration of the buffer, as well as the information captured within the buffer, can be adjusted and/or changed to suit the particular application.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method for detecting inattentive vehicle operation in a commercial vehicle comprising:
   analyzing trailer monitoring data, which includes at least one of sensor data and image data, to detect a motion of a rear portion of a trailer and identify a motion trend in the trailer monitoring data;
   comparing the motion trend with a set of known inattentive driving trends; and identifying an inattentive driving event when the identified trend matches a known inattentive driving trend in the set of known inattentive driving trends;

wherein the analyzing to detect and identify, the comparing, and the identifying are performed by an electronic control unit; and wherein the set of known inattentive driving trends includes at least one of the following inattentive driving trends:
sinusoidal swaying of the rear portion of the trailer;
abrupt motion of the rear portion of the trailer; and
a lack of motion of the rear portion of the trailer as compared to one of a lane line and a road edge detection.

2. The method of claim 1, further comprising responding to an identified inattentive driving event by storing video from a driver monitoring system.

3. The method of claim 2, wherein the stored video includes a duration before the identified inattentive driving event.

4. The method of claim 2, wherein said storing comprises storing a portion of the video after the identified inattentive driving event.

5. The method of claim 1, wherein the motion of the rear portion of the trailer is monitored using exclusively image-based monitoring.

6. The method of claim 1, wherein the motion of the rear portion of the trailer is monitored using a combination of the sensor data and the image data.

7. The method of claim 6, wherein the sensor data includes data from at least one of a trailer wheel speed monitor, a lane detector, a road edge detector, and a positioning system.

8. The method of claim 1, wherein the set of known inattentive driving trends includes rule-based driving trends and machine learning determined driving trends.

9. A commercial vehicle comprising:
a tractor and at least one trailer;
at least one first camera configured to capture images of a rear portion of the trailer; and
an electronic control unit configured to:
monitor a motion of the rear portion of the trailer in the images and identify a motion trend in response thereto;
compare the motion trend with a set of known inattentive driving trends; and
identify an inattentive driving event when the identified trend matches a known inattentive driving trend in the set of known inattentive driving trends;
wherein the set of known inattentive driving trends includes at least one of the following inattentive driving trends:
sinusoidal swaying of the rear portion of the trailer;
abrupt motion of the rear portion of the trailer; and
a lack of motion of the rear portion of the trailer as compared to one of a lane line and a road edge detection.

10. The commercial vehicle of claim 9, further comprising a driver monitoring system including at least one second camera configured to capture at least a portion of a vehicle operator.

11. The commercial vehicle of claim 10, wherein the driver monitoring system includes a buffer configured to store a duration of video feed from the at least one first camera in response to an inattentive driving event, the duration of video feed at least partially preceding the inattentive driving event.

12. The system of claim 10, wherein the electronic control unit is configured to:
based on the identified inattentive driving event, provide a signal to the driver monitoring system to save a predefined portion of video from the at least one second camera leading up the inattentive driving event.

13. The commercial vehicle of claim 9, including at least one of a trailer wheel speed sensor, a lane line sensor, a trailer hitch angle sensor, and a road edge sensor.

14. A system, comprising:
at least one first camera configured to capture images of a rear portion of a trailer; and
an electronic control unit configured to:
monitor a motion of the rear portion of the trailer in the images and identify a motion trend in response thereto;
compare the motion trend with a set of known inattentive driving trends; and
identify an inattentive driving event when the identified trend matches a known inattentive driving trend in the set of known inattentive driving trends;
wherein the set of known inattentive driving trends includes at least one of the following inattentive driving trends:
sinusoidal swaying of the rear portion of the trailer;
abrupt motion of the rear portion of the trailer; and
a lack of motion of the rear portion of the trailer as compared to one of a lane line and a road edge detection.

15. The system of claim 14, further comprising a driver monitoring system including at least one second camera configured to capture at least a portion of a vehicle operator.

16. The system of claim 15, wherein the driver monitoring system includes a buffer configured to store a duration of video feed from the at least one first camera in response to an inattentive driving event, the duration of video feed at least partially preceding the detected inattentive driving event.

* * * * *